Aug. 30, 1949.  E. H. DESMOULINS  2,480,806
PROPELLER DRIVING UNIT
Filed May 25, 1940  2 Sheets-Sheet 1

Inventor
Emile H. Desmoulins.
By William C. Linton, Attorney

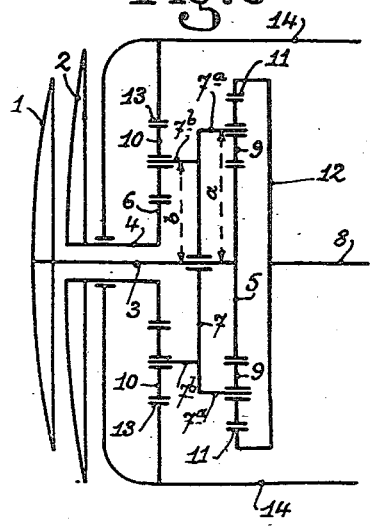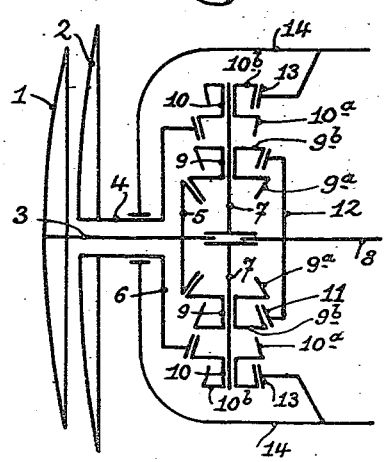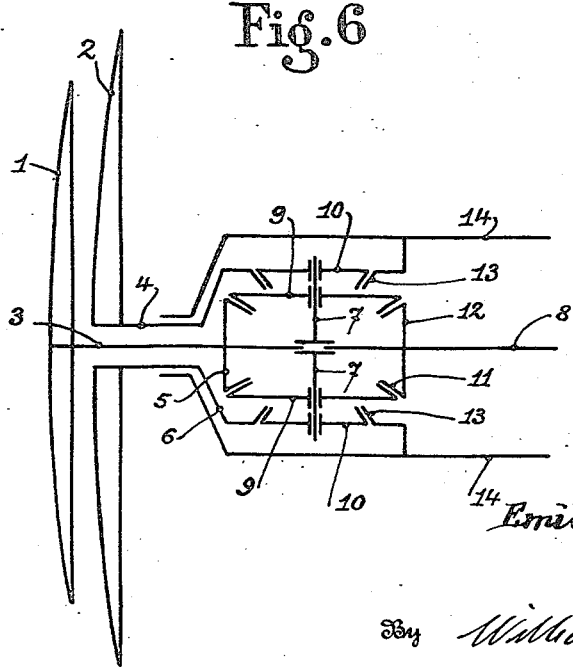

Patented Aug. 30, 1949

2,480,806

UNITED STATES PATENT OFFICE 2,480,806

PROPELLER DRIVING UNIT

Emile Hyacinthe Desmoulins,
Issy-les-Moulineaux, France

Application May 25, 1940, Serial No. 337,296
In France March 7, 1939

Section 3, Public Law 690, August 8, 1946
Patent expires March 7, 1959

2 Claims. (Cl. 170—135.28)

The present invention relates to propeller driving units of the character set forth in my copending application Serial No. 246,252 filed December 17, 1938, and it is an object of the present invention to provide a transmission for oppositely driven propellers for airplanes, boats and similar motor driven vehicles wherein the speed of rotation of the propellers may be controlled in an efficient and economical manner while being driven from one and the same motor.

Other objects of the invention will be in part obvious and in part pointed out hereinafter.

Figure 1:
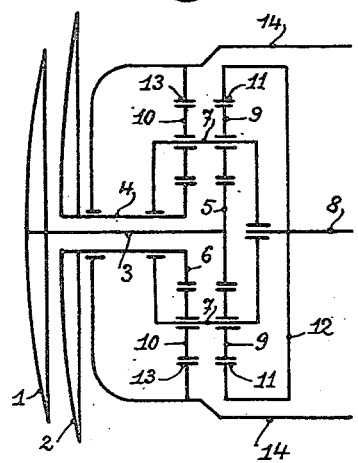

In the accompanying drawings:

Fig. 1 is a vertical longitudinal sectional view of a propeller driving unit embodying the present invention, and Figs. 2 to 7 are similar views showing slightly modified forms of the invention.

That form of the invention shown in Fig. 1 of the drawings comprises two coaxial propellers 1 and 2 secured to the outer ends of the driven shafts 3 and 4 respectively. The internal shaft 3 has journalled thereupon the tubular shaft 4 and fixed to the respective inner ends of these shafts are the sun gears 5 and 6. The driving shaft 8 extends coaxial with the shafts 3 and 4 and freely journalled upon the shafts 4 and 8 is a carrier 7. The planetary pinions 9 and 10 are rotatably mounted upon the carrier 7 and the pinions 9 are in mesh with the sun gear 5, whereas the pinions 10 are in mesh with the sun gear 6. The internal orbital driving gear 11 meshes with the pinions 9 and is secured to a carrier secured to the driving shaft 8. The gear housing 14 which is provided with a bearing for the tubular shaft 4 has also secured thereto a stationary internal orbital gear 13 which latter meshes with the pinions 10. All of the gears herein are of the spur gear type and the pinions 9 and 10 all have the same radius and are coaxially arranged in pairs upon the carrier 7. The sun gears 5 and 6 are also coaxially arranged and of the same interior diameters.

Figure 2:
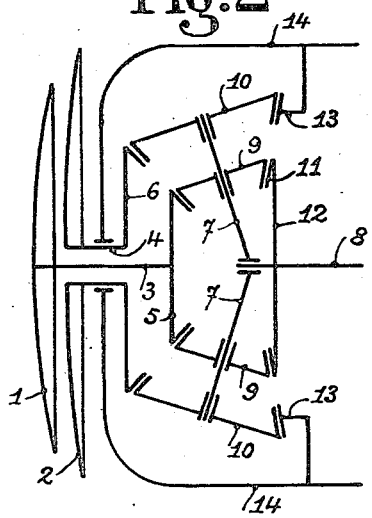

In Fig. 2 I have illustrated the use of either spur teeth or bevel teeth gears and the axis of rotation of the planetary pinions being arranged at an angle with respect to the perpendicular axis of rotation of the sun gears. The sun gear 5a as carried by the driven propeller shaft 3 is less in diameter than that of the sun gear 6a carried by the driven propeller shaft 4. The orbital gear 11a secured to the carrier 12a of the driving shaft 8 is of less diameter than that of the internal diameter of the stationary orbital gear 13a carried by the gear housing 14a. The carrier 7a is rotatably supported upon the driving shaft 8 and has journalled for rotation thereupon sets of intermediate pinions. Each set of pinions comprises an inner pinion 9a of less diameter than that of the outer pinion 10a. The pinions 9a are each in mesh with the sun gear 5a and the orbital driving gear 12a, whereas the pinions 10a are each in mesh with the sun gear 13a. From this arrangement it will be noted that due to the angle of rotation of the pinions 9a and 10a the teeth of the sun gears 5a and 6a will be in prolongation to one another and the teeth of the orbital gears 11a and 13a are in prolongation of one another.

Figure 3:
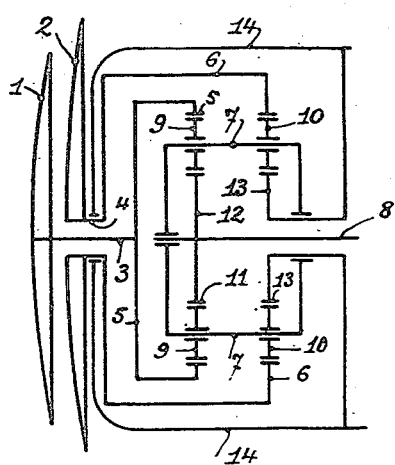

In Fig. 3 of the drawings the gears attached to the propeller shafts 3 and 4 are internal orbital gears 5b and 6b respectively and are in mesh with the pinions 9b and 10b mounted upon the carrier 7b. The sun gear 11b secured to the carrier 12b of the driving shaft 8b is in mesh with the pinions 9b, whereas the stationary sun gear 13b is secured to an inward extension of the gear housing 14b. The carrier 7b is provided with bearings rotatably supported upon the outer end of the shaft 8 and the inward extension of the housing 14b. In this form of the invention the axis of rotation of the pinions is concentric with that of the driving shaft 8 and the diameter of the sun gears are the same, whereas the interior diameter of the orbital gears are the same.

Figure 4:
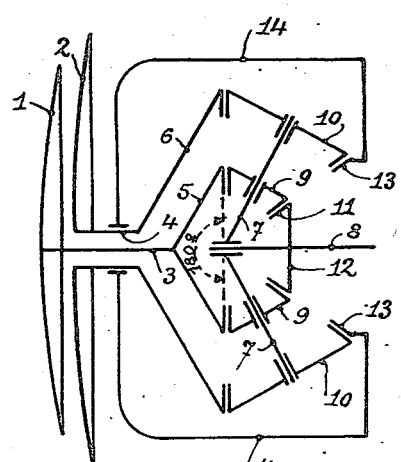

In the modification of the invention as shown in Fig. 4 the gears may be of the beveled type and the axis of rotation of the planetary pinions being arranged at an obtuse angle with respect to the driving shaft, but at an angle opposite to that of the axis of rotation of the pinions as shown in Fig. 2. The gears 5c and 6c carried by the propeller shafts 3 and 4 respectively are of different diameters, but concentrically arranged with respect to one another. A sun gear 11c is secured to the carrier 12c carried by the driving shaft 8 and the stationary gear 13c of greater diameter than that of the sun gear 11c is fixed to the gear housing 14c. The carrier 7c is journalled upon the driving shaft 8 and the intermediate pinions 9c and 10c are freely mounted for rotation upon this carrier 7c. The pinions 9c are in mesh with the gears 5c and 11c whereas the pinions 10c are in mesh with the gears 6c and 13c.

The arrangement as shown in Fig. 5 of the drawings the sun gear 5d and 6d secured to the propeller shafts 3 and 4 respectively are of different external diameters, the interior diameters of the orbital gears 11d and 13d are also of different internal diameters and the intermediate pinions 9d and 10d are of the same diameters but the respective axis of rotation are located at different distances for the shaft 3. The carrier 7d is journalled for rotation about the shaft 3 and carries the spindles 7a and 7b. The spindles 7a for the pinions 9d are concentric with, but arranged at a distance further from the shaft 3 than that of the spindles 7b having the pinions 10 journalled thereupon. The stationary gear 13d is supported by the gear housing 14d, whereas the gear 11d is secured to a carrier 12d driven by the driving shaft 8.

In Fig. 6 of the drawings the carrier 7e is journalled for rotation about the coaxial shafts 3 and 8 and the beveled gear pinions 9e and 10e are mounted therefore for rotation in planes parallel with these coaxial shafts 3 and 8. The sun gear 5e carried by the propeller shaft 3 and the gear 11e of equal diameter therewith carried by the driving shaft 8 are in mesh with the pinions 9e, whereas the pinions 10e of diameters less than that of the pinions 9e are in mesh with the stationary gear 13e carried by the gear housing 14e and the gear 6e carried by the propeller shaft 4.

In Fig. 7 of the drawings I have illustrated another form of the invention in which the carrier 7f as journalled for rotation upon the shafts 3 and 8 carries intermediate pinions arranged in sets of four each and these pinions are of the beveled teeth type. Each set of pinions are formed integral so as to jointly rotate together. The pinions 9a are in mesh with the gear 5f carried by the propeller shaft 3; the pinions 9b are in mesh with the gear 11f secured to the carrier 12f driven by the shaft 8; the pinions 10b are in mesh with the stationary gear 13f carried by the gear housing 14f and the pinions 10a are in mesh with the gear 6f carried by the propeller shaft 4.

I claim:

1. A propeller driving unit comprising in combination a driving shaft, a driving gear connected to said shaft, a driven shaft, a tubular driven shaft journalled upon said driven shaft, said driven shafts being coaxially arranged with said driving shaft, a propeller carried by one end of each of said driven shafts, a driven gear carried by the opposite end of each of said driven shafts, a carrier freely rotatable about said driving shaft, a pair of bearings formed in said carrier with the end of said driving shaft rotatable in one bearing and said tubular shaft rotatable in the other of said bearings, sets of compound planetary pinions freely journalled upon said carrier, a stationary orbital gear, one pinion of each set being in direct gear engagement with said stationary orbital gear and said driven gear carried by said tubular driven shaft and the other of said pinions of each set being in direct gear engagement with said driving gear and said driven gear carried by said driven shaft.

2. A propeller driving unit comprising in combination a driving shaft, a carrier secured to the front portion of said driving shaft and extending therefrom, an internal driving gear connected to said carrier and positioned concentric with said driving shaft, a driven shaft, a tubular driven shaft journalled upon said driven shaft, a pair of propellers each connected to the outer end of one of said driven shafts, a sun gear carried by the inner end of each driven shaft, said sun gears being of the same external diameter, a second carrier, a pair of bearings formed in said second carrier and having the front end of said driving shaft rotatably supported in one bearing and said tubular shaft rotatably supported in the other bearing, sets of planetary pinions freely rotatable upon said second carrier and having the same external diameter, a stationary orbital gear having internal teeth of the same diameter as that of said internal driving gear, one pinion of each set being in gear engagement with said sun gear carried by said tubular shaft and said stationary orbital gear and the other pinion of each set being in gear engagement with said sun gear carried by said driven shaft and said internal driving gear.

EMILE HYACINTHE DESMOULINS.

REFERENCES CITED

The following references are of record in the file of this patent:

UNITED STATES PATENTS

| Number | Name | Date |
|---|---|---|
| 1,821,450 | Stelzer | Sept. 1, 1931 |
| 1,902,374 | Pirinoli | Mar. 21, 1933 |
| 1,992,333 | Stelzer | Feb. 26, 1935 |
| 2,067,023 | Schleicher | Jan. 5, 1937 |
| 2,085,483 | Trebucien | June 29, 1937 |
| 2,148,313 | Williams | Feb. 21, 1939 |
| 2,154,532 | Ryder | Apr. 18, 1939 |

FOREIGN PATENTS

| Number | Country | Date |
|---|---|---|
| 356,090 | Italy | Jan. 25, 1938 |
| 357,807 | Italy | Mar. 28, 1938 |
| 421,889 | Great Britain | Dec. 24, 1934 |
| 722,339 | France | Dec. 29, 1931 |